US010781088B2

(12) United States Patent
Sunwoo et al.

(10) Patent No.: US 10,781,088 B2
(45) Date of Patent: Sep. 22, 2020

(54) CONTROLLER FOR HOIST CAPABLE OF MULTI-SPEED CONTROL AND HOIST INCLUDING THE SAME CONTROLLER

(71) Applicant: DAESAN INOTEC INC., Gongju-si, Chungcheongnam-do (KR)

(72) Inventors: Young Ku Sunwoo, Asan-si (KR); Si Kyung Kim, Cheonan-si (KR)

(73) Assignee: DAESAN INOTEC INC., Gongju-si, Chungcheongnam-Do (KR)

(*) Notice: Subject to any disclaimer, the term of this patent is extended or adjusted under 35 U.S.C. 154(b) by 0 days.

(21) Appl. No.: 16/578,728

(22) Filed: Sep. 23, 2019

(65) Prior Publication Data
US 2020/0180921 A1    Jun. 11, 2020

(30) Foreign Application Priority Data

Dec. 7, 2018    (KR) ..................... 10-2018-0156601

(51) Int. Cl.
| B66D 3/26 | (2006.01) |
| B66C 13/44 | (2006.01) |
| H01H 36/00 | (2006.01) |
| H02P 27/06 | (2006.01) |

(52) U.S. Cl.
CPC ............ B66D 3/26 (2013.01); B66C 13/44 (2013.01); H01H 36/00 (2013.01); B66C 2700/085 (2013.01); B66C 2700/088 (2013.01); B66D 2700/025 (2013.01); H02P 27/06 (2013.01)

(58) Field of Classification Search
CPC ............ H02P 27/06; H01H 36/00; B66D 3/26
USPC ........................................ 318/3, 34
See application file for complete search history.

(56) References Cited

U.S. PATENT DOCUMENTS 7,262,568 B2*    8/2007    Takada ..................... H02P 6/06
                                                          318/400.3

FOREIGN PATENT DOCUMENTS

JP          H03213289 A    9/1991
KR          101297839 B1   8/2013

* cited by examiner

Primary Examiner — David Luo
(74) Attorney, Agent, or Firm — Dinsmore & Shohl LLP; Yongsok Choi, Esq.

(57) ABSTRACT

Disclosed herein is a controller of a hoist. The controller of the hoist includes a lift up button which is adjustable in a pressed degree; a lift down button which is adjustable in a pressed degree; a lift up switch disposed below the lift up button so as to be immediately operated when the lift up button is pressed; a lift down switch disposed below the lift down button so as to be immediately operated when the lift down button is pressed; a magnet body connected to both of the lift up button and the lift down button and disposed to descend during a pressing operation of the lift up button or the lift down button; and a Hall sensor disposed to correspond to the magnet body so as to detect a descending degree of the magnet body being pressed by the lift up button or the lift down button.

4 Claims, 11 Drawing Sheets

ALL OF FOLLOWING FUNCTIONS ARE INTEGRATED
INVERTER
INTEFACE
TRANSFORMER
CT
LOAD LIMITER
RECTIFIER
MAGNETIC CONTACTOR
BLUETOOTH

CONTROL IS POSSIBLE WITH MOBILE DEVICE THROUGH BLUETOOTH COMMUNICATION

CONTROLLER FOR HOIST CAPABLE OF MULTI-SPEED CONTROL AND HOIST INCLUDING THE SAME CONTROLLER

CROSS-REFERENCE TO RELATED APPLICATION

This application claims priority to and the benefit of Korean Patent Application No. 10-2018-0156601, filed on Dec. 7, 2018, the disclosure of which is incorporated herein by reference in its entirety.

BACKGROUND

1. Field of the Invention

The present invention relates to a controller for a hoist, which is capable of controlling multi-speeds, and a hoist including the same.

2. Discussion of Related Art

Generally, a hoist is a device which is used for transporting a cargo in a warehouse, a railway station, a mold factory, a casting factory, and the like or used for disassembling and assembling machinery in a factory and is a device for lifting a heavy object through an operation of a motor to transfer the heavy object to a desired position.

The hoist includes a motor, a speed reduction gear device, a brake, and the like. A hook is provided at an end of a load chain to lift up a cargo and then move in a transverse direction (left-right direction) to transfer the lifted cargo to a desired position. Typically, the hoist may be broadly classified into an electric hoist, an air hoist, and the like.

The electric hoist is a small traction machine in which a small electric motor, a winding drum with a planetary gear-type speed reducer, an electromagnetic brake which holds a cargo, a load brake which controls a speed when a cargo is lifted down are concentrated on a narrow container space. The electric hoist is attached to an end of a jib or is used for transferring a cargo by lifting up and down the cargo while traveling on a flange below an I-shaped beam through a rail. The electric hoist employs a method of manipulating a rope to move a motor on the ground, a method of moving a button, a remote manipulation method, or the like.

The air hoist is mainly used in a place for preventing a risk of gas explosion, such as a coal mine, a chemical plant, or the like.

Further, in addition to the above-described electric hoist and air hoist, the hoist may be classified into various types of hoists, such as a low head type hoist used at a place in which a ceiling is low, a double rail type hoist traveling on two rails, and the like, according to a use place and a structure of a machine.

The electric hoist among the various types of hoists may be classified into a hoist using a relay switch and a hoist using an inverter. Among these hoists, the hoist using the relay switch cannot be miniaturized because, when a control signal is generated according to lift up and down manipulations of an operator, the control signal is generated using a relay switch. Since a service life of the hoist using the relay switch is relatively short, materials costs and labor costs are largely consumed, and, since a wiring is complicated, there are problems in that it is difficult to manufacture the hoist using the relay switch in a small size and a light weight, a large amount of electric power is consumed, and noise such as electromagnetic waves is severely generated.

In order to solve the above-described problems of the relay type hoist, an electric hoist using an inverter driven motor, which is driven by an inverter embedded in a main body, has appeared.

Unlike the relay type hoist, the electric hoist using an inverter driven motor may generate a signal according to a button operation of an operator through a contactless interface element, transmit the signal to an inverter, and control driving of a motor. Consequently, when compared with the conventional relay type hoist, a service life of the electric hoist using an inverter driven motor can be semi-permanent, a small size and weight reduction of the electric hoist using an inverter driven motor can be achieved, and the electric hoist using an inverter driven motor can be disposed to be close to the inverter to prevent malfunction due to noise. Further, since a wiring of the electric hoist using an inverter driven motor is simple, there are effects in that a production cost can be reduced due to a decrease in materials costs and labor costs, electricity can be saved, after service (A/S) can be facilitated through blocked components, and the inverter can be prevented from an abnormal voltage by completely separating an input and an output.

An inverter interface controller of a related art can control a motor (induction motor) in two speeds. For example, the inverter interface controller can rotate the motor at speeds of 1,000 revolutions per minute (RPM) and 1,500 RPM. Only a two-stage speed control switch is implemented in a controller for controlling two-stage speeds. An inverter interface control method of the related art is shown in FIG. 1. As shown in FIG. 1, a controller (a controller of a hoist is called a teaching pendant, and the controller is indicated as a teaching pendant in FIG. 1) can control only three-stage speeds of a neutral, a first-stage speed, and a second-stage speed when a button is in a pressed state. In the predetermined three-stage speeds, an inverter connected to an inverter control terminal block can control a motor to vary a speed in only three states of a neutral state (in which the motor is stopped), a first-stage state (a ½ speed of a rated speed), and a second-stage state (the rated speed).

SUMMARY OF THE INVENTION

The present invention is directed to a controller of a hoist, which is capable of performing multi-stage speed control of lifting up and down of an electric hoist using an inverter driven motor.

The present invention is also directed to a hoist including the controller.

A typical configuration of the present invention for achieving the above-described objectives is as follows.

The present invention relates to a controller of a hoist. According to an aspect of the present invention, there is provided a controller of a hoist, which includes a lift up button which is adjustable in a pressed degree; a lift down button which is adjustable in a pressed degree; a lift up switch disposed below the lift up button so as to be immediately operated when the lift up button is pressed; a lift down switch disposed below the lift down button so as to be immediately operated when the lift down button is pressed; a magnet body operatively connected to both of the lift up button and the lift down button and disposed to descend during a pressing operation of the lift up button or the lift down button; and a Hall sensor disposed to correspond to the magnet body so as to detect a descending degree of the magnet body being pressed by the lift up button or the lift down button. When the lift up switch is operated by the lift up button, a motor may initiate an ascending operation, and in this case, a variable resistance value, which is applied to the motor according to an output voltage which is varied according to an increase or decrease of a magnetic flux density detected by the Hall sensor, may be adjusted such that a speed of the ascending operation of the motor is varied. When the lift down switch is operated by the lift down button, the motor initiates a descending operation, and in this case, the variable resistance value, which is applied to the motor according to the output voltage which is varied according to an increase or decrease of the magnetic flux density detected by the Hall sensor, may be adjusted such that a speed of the descending operation of the motor is varied.

The output voltage of the Hall sensor may be input to an analog-to-digital converter and then converted into a digital value, and the converted digital value may be converted into a variable resistance value which is proportional to a depressed degree of the lift up or down button of the controller using digital potentiometer control software and a digital potentiometer control circuit of a microprocessor.

In addition to the above-described configuration, additional configurations may further be included in the controller of the hoist according to the invention or in the hoist including the controller.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
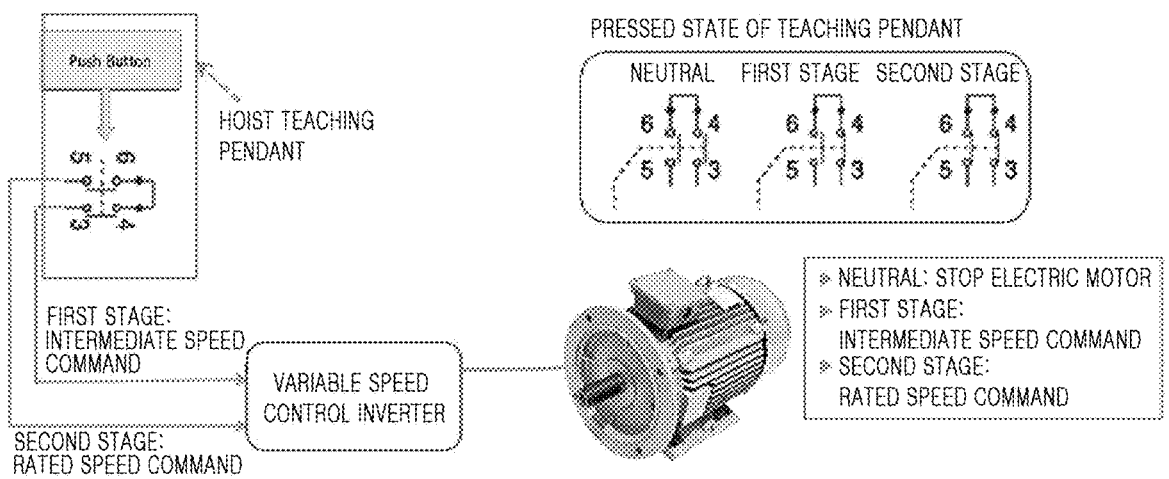
FIG. 1 is a diagram illustrating an inverter interface control method according to a related art.

In the following detailed description, reference is made to the accompanying drawings that illustrates, by way of illustration, specific embodiments in which the present invention may be practiced. These embodiments are fully described in detail to allow those skilled in the art to practice the present invention. It should be understood that various embodiments of the present invention, although different, are not necessarily mutually exclusive. For example, specific forms, structures, and characteristics described herein may be implemented by being altered from one embodiment to another embodiment without departing from the spirit and scope of the present invention. Further, it should be understood that positions or arrangement of individual elements within each embodiment may also be modified without departing from the spirit and scope of the present invention. Accordingly, the following detailed description is not to be taken in a limiting sense, and the scope of the present invention should be construed to include the scope of the appended claims and equivalents thereof. In the drawings, like numerals refer to the same or similar components throughout various aspects.

Hereinafter, exemplary embodiments of the present invention will be described in detail with reference to the accompanying drawings so as to allow those skilled in the art to which the present invention pertains to practice the present invention.

Hereinafter, plural types of inverter-type hoists will be described with reference to FIGS. 2 to 5.

Figure 2:
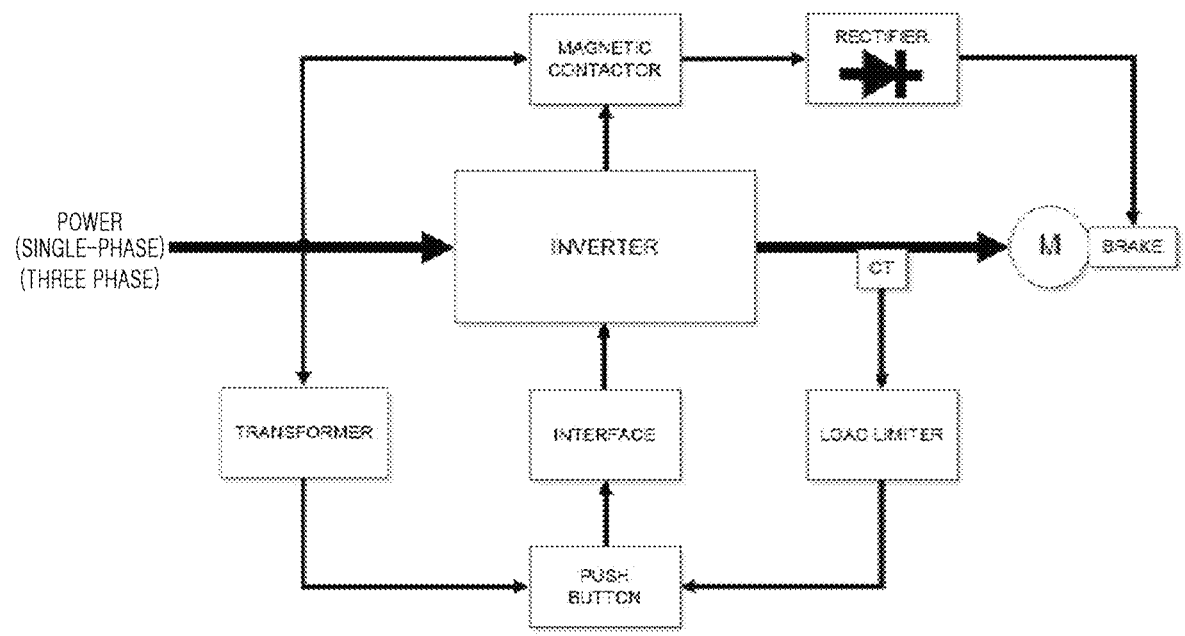
FIG. 2 is a diagram for describing functions of an inverter and peripheral functional parts in an inverter-type hoist using a general-purpose inverter.

First, FIG. 2 is a diagram for describing functions of an inverter and peripheral functional parts in an inverter-type hoist using a general-purpose inverter. The inverter is a functional part which controls a motor at a desired speed by varying a voltage and a frequency in a variable voltage variable frequency (VVVF) method. A transformer is a functional part which converts an input voltage to an alternating current (AC) voltage of, e.g., 110V to use the AC voltage of 110V as a control power source. An interface is a functional part which serves as a medium (electronic relay) for controlling the inverter at the AC voltage of, e.g., 110V. A push button is a functional part which serves as a push button switch for manipulating the hoist. A functional part indicated as "CT" converts a current ratio. A load limiter is a functional part which receives a variation in current according to a load from the CT to control a lift up operation of the hoist. A magnetic contactor is a functional part which performs a function of supplying a voltage to a rectifier and is controlled by an inverter. The rectifier is a functional part which performs a function of converting an AC voltage into a direct-current (DC) voltage. A brake is a functional part which serves as a solenoid-type motor brake operated by a DC current. The rectifier and the solenoid-type brake are components which are functionally connected. That is, the rectifier converting the AC voltage into the DC voltage is provided because the solenoid-type brake is operated by the DC current. When the solenoid-type brake is not used and a mechanical brake is used, it is not necessary to convert the AC voltage into the DC voltage and thus the rectifier may be omitted from an entirety of a configuration. A functional part indicated as "M" is a three-phase squirrel-cage induction motor and is a functional part which generates a driving force of the hoist. Power is three-phase and single-phase input voltages and is a functional part which performs a function of supplying power to the hoist. It should be understood that the functions of the peripheral functional parts including the inverter in the above-described inverter-type hoist are well known in the art at the time of filing of the present invention and can be clearly understood by those skilled in the art without further description.

Figure 3:
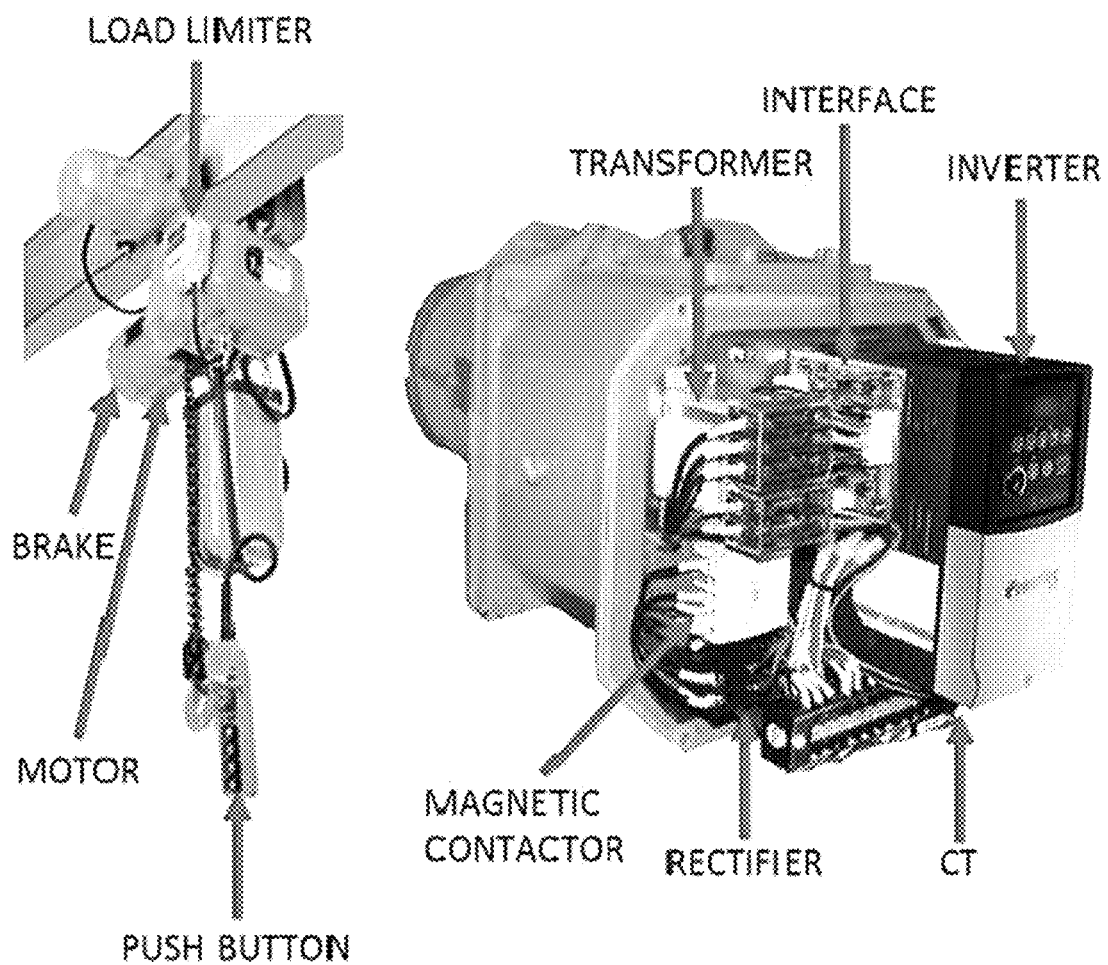
FIG. 3 is a diagram illustrating an appearance of the inverter-type hoist using the general-purpose inverter.

FIG. 3 is a diagram illustrating an appearance of an inverter-type hoist using a general-purpose inverter. Referring to FIG. 3, it can be seen more specifically of an appearance of a hoist in which a general-purpose inverter is used as an inverter functional part.

Figure 4:
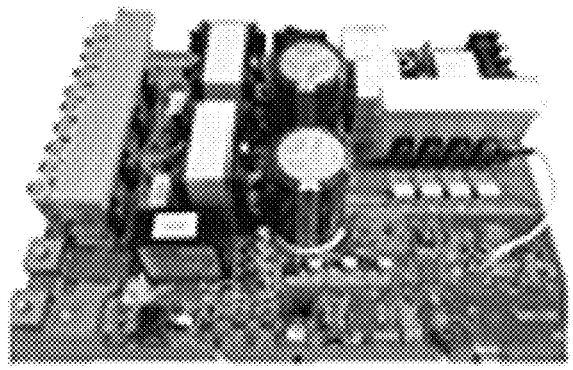
FIG. 4 is a diagram illustrating a concept of a hoist including an inverter integrated board.
Figure 4:
Figure 4:
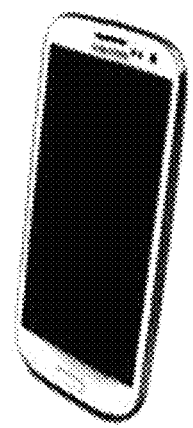
Figure 11:
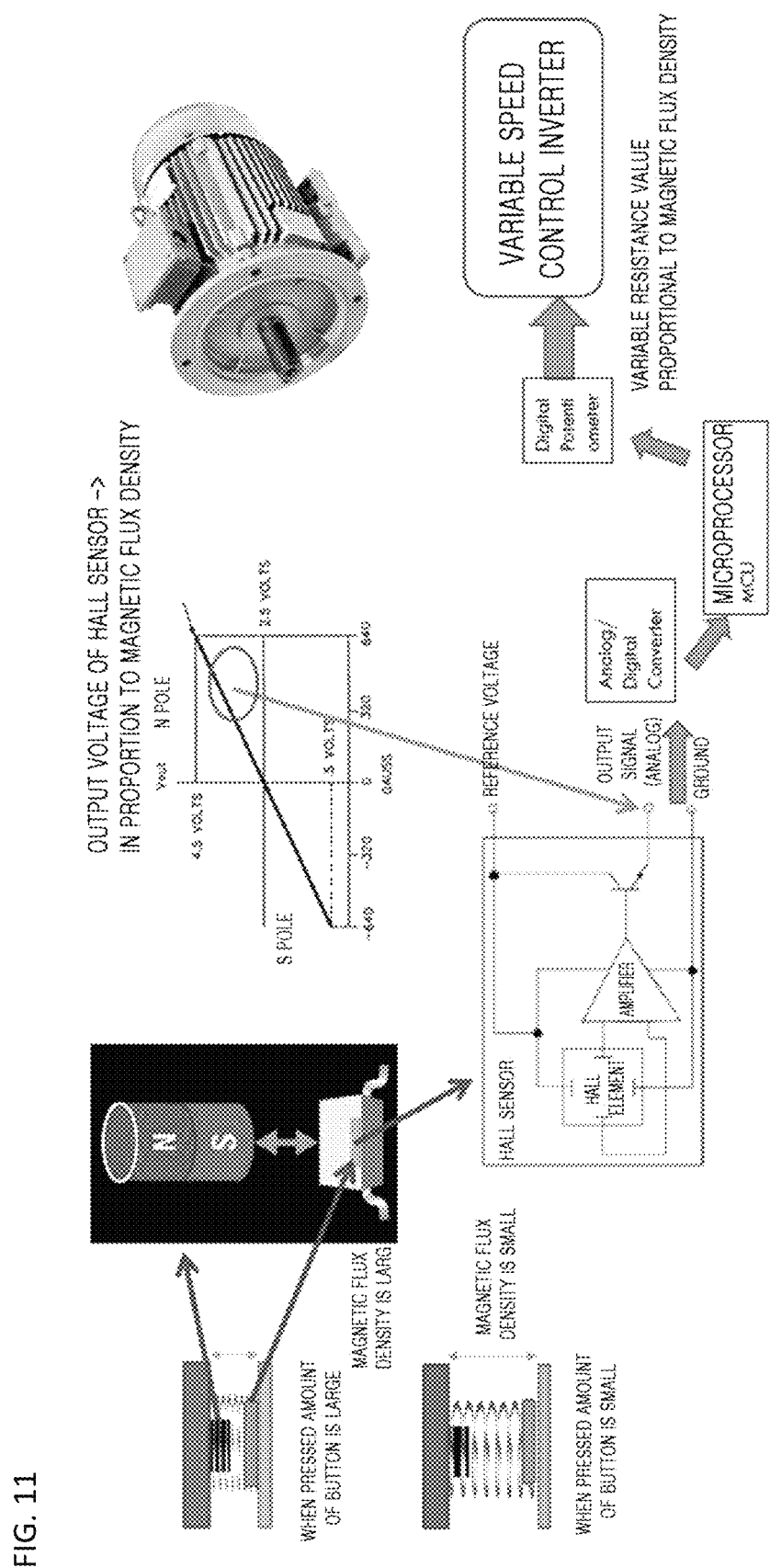
FIG. 11 is a diagram illustrating a control method performed by the controller which is described with reference to FIGS. 7 to 10.

As compared with the embodiment of FIG. 3, a concept of a hoist including an inverter integrated board according to FIG. 4 should be understood. Referring to FIG. 4, it will be clearly understood that the inverter function part and the peripheral functional parts of the inverter functional part, which are described in FIG. 2, may be integrated into a single board. Specifically, according to an embodiment of FIG. 4, the inverter functional part, the interface functional part, the transformer functional part, the CT functional part, the load limiter functional part, the rectifier functional part, and the magnetic contactor functional part may be integrated into a single board. Further, a radio control functional part may be added. The radio control functional part is indicated as "Bluetooth" in FIG. 4. The radio control functional part may be implemented as a functional part which replaces the function of the push button functional part described in the embodiment of FIG. 2. In the embodiment shown in FIG. 4, it should be definitely understood that, instead of a general-purpose inverter, the inverter functional part for driving the hoist, i.e., a functional part for controlling the motor at a desired speed (e.g., as shown in FIG. 11, a control functional part controls a speed of the motor in a multiple stage) is integrated with the other functional parts into a single board. When compared with FIG. 3, features of the embodiment shown in FIG. 4 can be clearly understood. That is, a wiring between the functional parts is not necessary, and a terminal pressing process and a terminal tightening process may be omitted. Thus, since manual processes are significantly omitted, labor costs may be saved and production time may be shortened. Further, causes of various defects occurring in an assembly process, such as a wiring defect, a terminal pressing defect, a terminal tightening defect, and the like, may be fundamentally removed.

Figure 5:
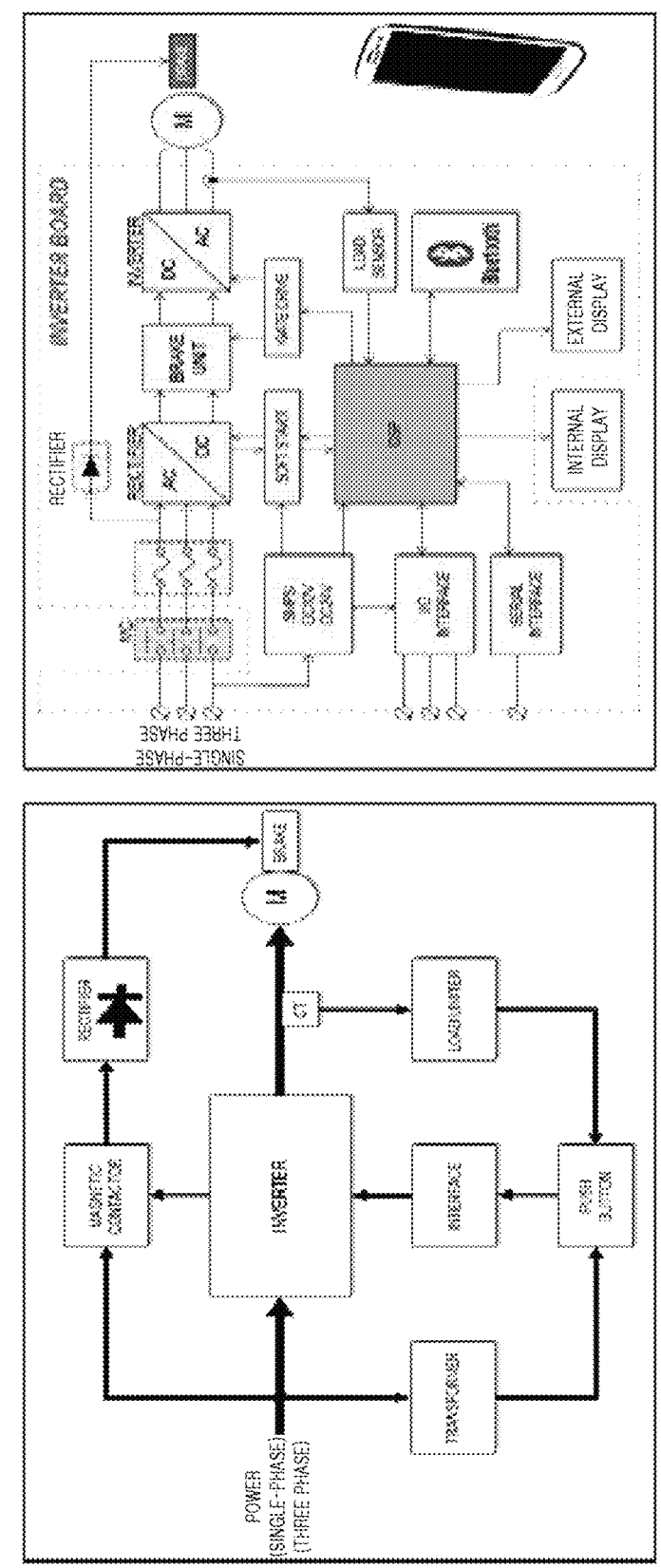
FIG. 5 is a diagram comparing a circuit diagram of the inverter-type hoist using the general-purpose inverter with a circuit diagram of the hoist including the inverter integrated board.

FIG. 5 is a diagram comparing a circuit diagram of an inverter-type hoist using a general-purpose inverter with a circuit diagram of a hoist including an inverter integrated board. Unlike the inverter-type hoist using a general-purpose shown in a left side of FIG. 5, in the hoist including an inverter integrated board, electric functional parts including the inverter functional part for driving the hoist are integrated into a single board. More specifically, the hoist including an inverter integrated board according to the embodiment of FIG. 4 of the present invention is developed such that a weight of an inverter is reduced and supply energy, which is instantaneously applied, is rapidly supplied for a short period of time such that initial driving is efficiently performed. Here, a capacity of each of two examples of integrated inverters, which have AC input voltages in a range of 200 to 240V and in a range of 380 to 460V was tested, and the hoist was developed to have a continuous driving time of 60 minutes or more with 3.7 KW (5 HP) in each of a single-phase and a three-phase. An AC/DC rectifier for the inverter was designed to convert commercial AC power into a motor driving DC voltage of the hoist including the inverter integrated board and developed to be able to supply a stable driving voltage irrespective of a variation characteristic of the inverter. With respect to a three-phase insulated gate bipolar transistor (IGBT) inverter circuit, a circuit composed of an IGBT switching element which controls to allow the motor to be rotated below 2,000 RPM was developed. Further, the hoist including the inverter integrated board may include a plurality of specific dedicated functions. For example, the hoist may include a load limiter function of blocking overload, a function of controlling a wired/wireless remote controller, a function of outputting brake power, a function of counting the number of times of use, a function of controlling Bluetooth communication, and a display function of monitoring an operating state. Functions performed by functional parts shown in FIG. 5 are as follows. First, a digital signal processor (DSP) is an integrated circuit which converts an analog signal into a digital signal to process the digital signal at a high speed. A switching mode power supply (SMPS) is a power supply device which converts AC power into DC power using a switching transistor and the like. A magnetic contactor is a component which performs a function of supplying a voltage to a rectifier. The rectifier is a component which converts an AC voltage into a DC voltage. A soft start is a component which smoothly drives a motor. A break unit is a component which consumes regenerative power of the motor, which is generated by inertia or gravity. An inverter is a component which converts a DC voltage into an AC voltage having a desired frequency and a desired voltage. A gate drive is a component which is turned on by allowing a small current to flow to the DSP to control the inverter and the brake unit. A load sensor is a component which detects a variation in current according to a weight. An input/output (I/O) interface is an input/output connector with an external device. A serial interface is a component which sets or changes the inverter using RS232 or the like as a serial interface. Bluetooth is a wireless interface component which connects to a mobile device and the like in a wireless manner. Internal and external displays show various information such as a use time of the hoist, a current, a voltage, and the like. A brake is a solenoid-type motor brake which is operated by a DC current. A component indicated as "M" is a single-phase or three-phase squirrel cage induction motor, and the "single-phase" and the "three-phase" represent a single-phase input voltage and a three-phase input voltage, respectively.

Figure 6:
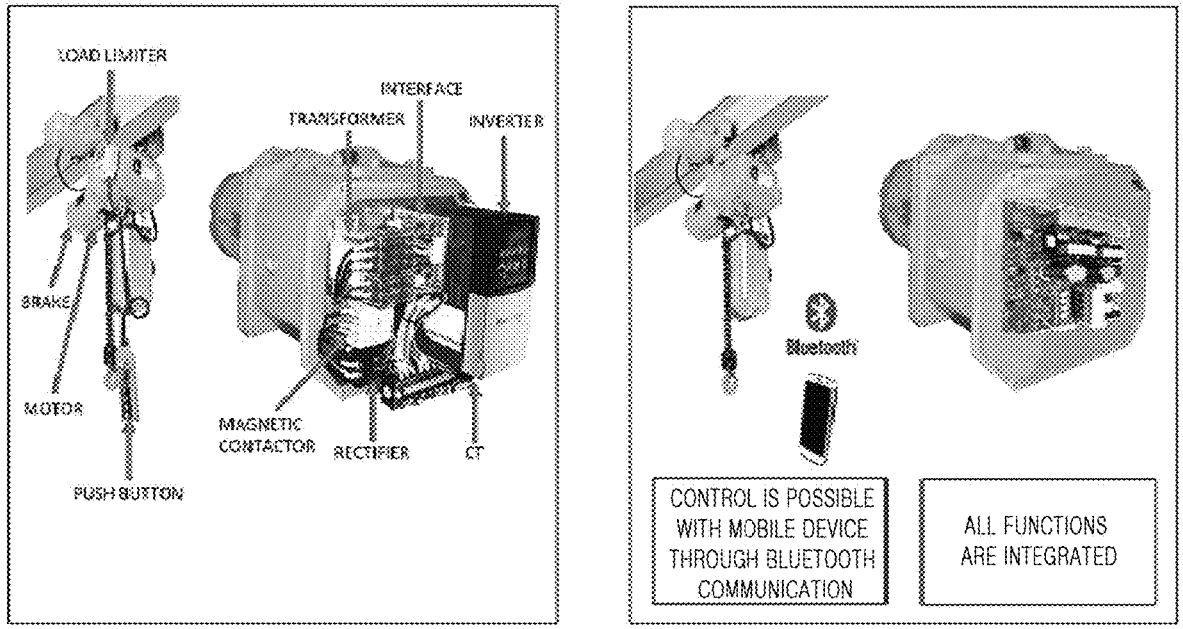
FIG. 6 is a diagram comparing the hoist including the inverter integrated board with the hoist using the general-purpose inverter.

FIG. 6 is a diagram comparing the hoist including the inverter integrated board with the hoist using the general-purpose inverter that clearly concisely illustrates technical features of the two hoists. Referring to FIG. 6, it can be intuitively understood that a feature due to the inverter integrated board, a feature in which the inverter integrated board is connectable to a user terminal in a wireless manner through a wireless connection interface such as Bluetooth, and a feature in which various arithmetic operations required for efficient hoist driving is operable through the user terminal including an arithmetic operation function.

Figure 7:
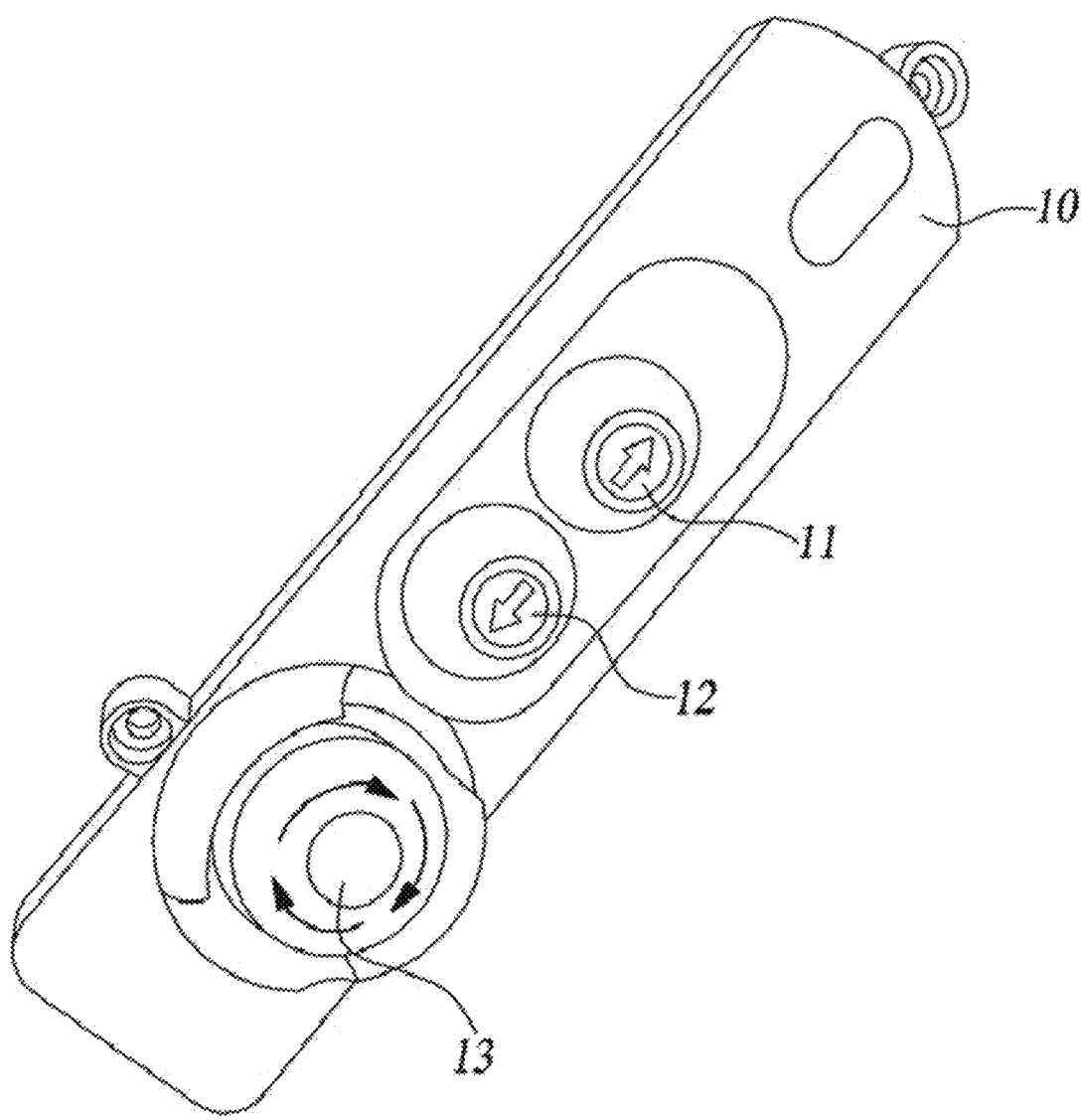
FIG. 7 is a diagram illustrating an appearance of a controller of a hoist, which is capable of control multi-stage speeds, according to one embodiment of the present invention.

FIG. 7 is a diagram illustrating a controller 10 of a hoist which is capable of controlling multi-stage speeds according to one embodiment of the present invention. The controller 10 of the embodiment of FIG. 7 employs a push button among the above-described control methods. Among the above-described control methods, there is present a wireless control method using a connection including Bluetooth without using a push button. The controller 10 of the hoist according to the present invention is limited to a method using a push button except for the wireless control method. Hereinafter, the controller 10 employing a push button will be described. This push-button controller 10 is applicable to both of the hoist including the inverter integrated board and the hoist using the general-purpose inverter, which are described above.

FIG. 7 illustrates an appearance of the push-button controller 10. The controller 10 is illustrated as having three buttons. A lift up button 11, a lift down button 12, and an ON/OFF button 13 of the hoist may be provided on the controller 10.

Figure 8:
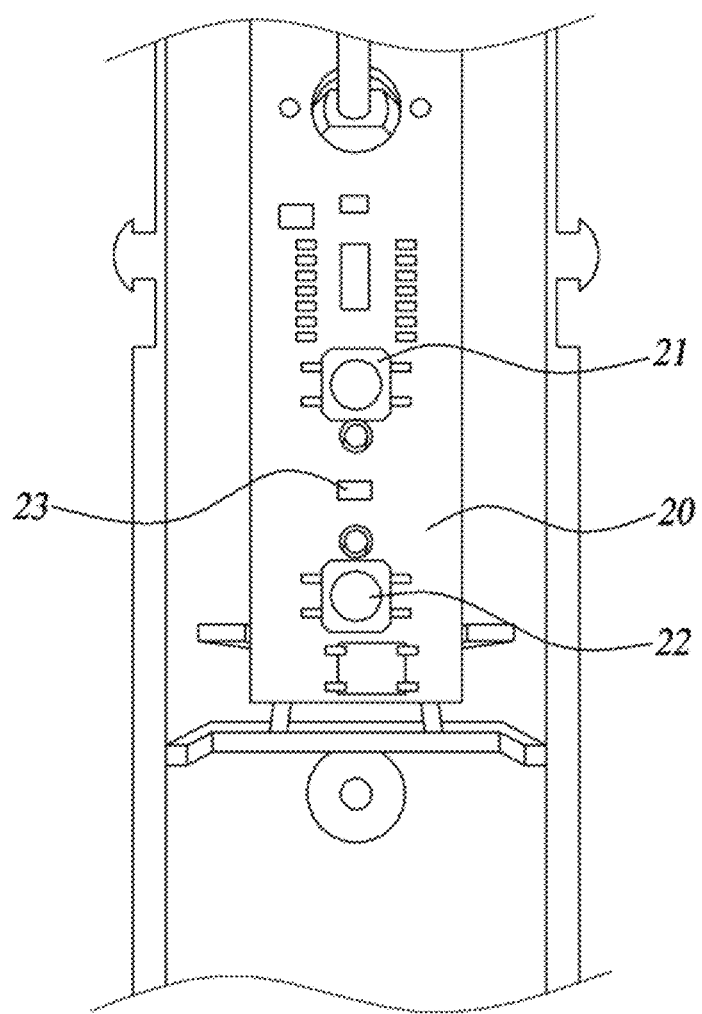
FIG. 8 is a diagram illustrating an interior of the controller including a substrate.

FIG. 8 is a diagram illustrating an interior of the controller 10 including a substrate 20. A lift up switch 21, a lift down switch 22, and a Hall sensor 23 are provided on the substrate 20. The Hall sensor 23 is a sensor which, when a magnetic field is applied to a conductor through which a current flows, detects a direction and a magnitude of the magnetic field using a Hall effect in which a voltage is generated in a direction perpendicular to the current and the magnetic field.

Figure 9:
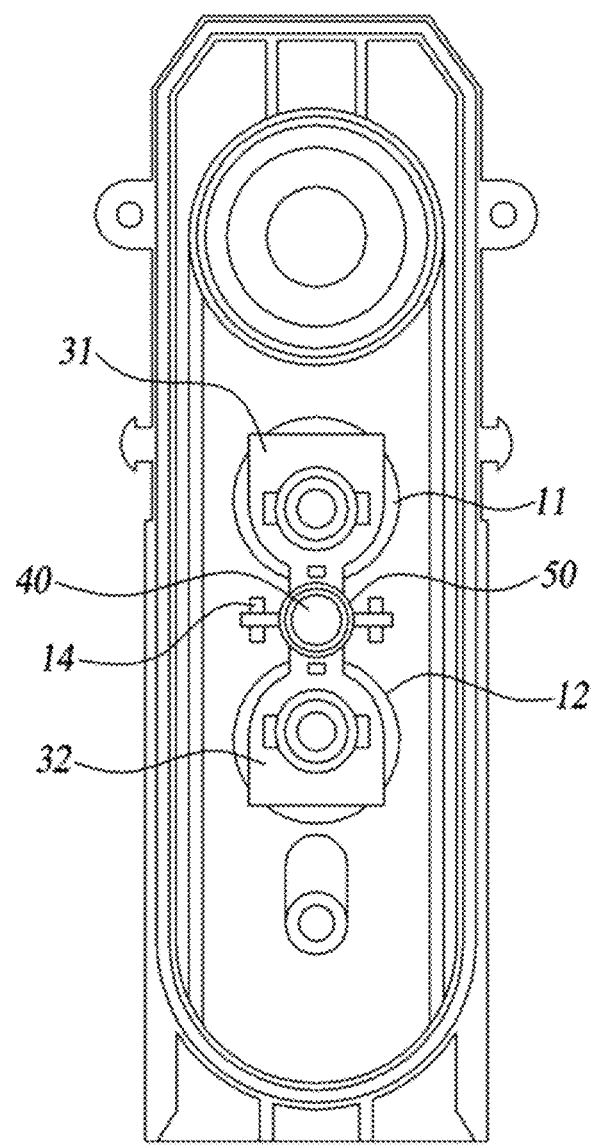
FIG. 9 is a diagram illustrating an internal structure relating to a lift up button and a lift down button which press the substrate shown in FIG. 8.

FIG. 9 illustrates an internal structure relating to the lift up button 11 and the lift down button 12 which press the substrate 20 shown in FIG. 8. A press transfer part, which transfers a pressed operation of each of the switches 21 and 22 to the switch 21 or 22 of the substrate 20, is provided below each of the lift up button 11 and the lift down button 12. The press transfer part corresponding to the lift up button 11 is a lift up button pressing transfer part 31, and the press transfer part corresponding to the lift down button 12 is a lift down button pressing transfer part 32. A magnet body guide 14 is installed between the press transfer parts. A magnet body 40 is provided to be able to ascend or descend along the magnet body guide 14. A spring 50 is connected to the magnet body 40. As shown in FIG. 9, one end portions of the lift up button 11 and the lift down button 12 are connected to the magnet body 40. Thus, when the lift up button 11 or the lift down button 12 is pressed, the magnet body 40 is pressed together to descend along the magnet body guide 14.

Referring to FIGS. 8 and 9, a structure in which the lift up button 11 and the lift down button 12 interact with the lift up switch 21, the lift down switch 22, and the Hall sensor 23, which are provided on the substrate 20, will be described.

When the lift up button 11 is pressed, the lift up button pressing transfer part 31 is pressed together. The lift up button pressing transfer part 31, which descends, operates the lift up switch 21 provided on the substrate 20, and the hoist recognizes that an ascending operation of the hoist is input by the controller 10. In this case, the magnet body 40 is pressed together. The magnet body 40 moves downward while pressurizing the spring 50 along the magnet body guide 14. A degree of a descending movement of the magnet body 40 is detected by the Hall sensor 23. Even when the lift up button 11 is slightly pressed, the lift up switch 21 is operated. In this state, a degree of pressing of the lift up button 11 may be adjusted. The degree of the descending movement of the magnet body 40 is adjusted according to the degree of the pressing of the lift up button 11, and the degree of the descending movement of the magnet body 40 is detected by the Hall sensor 23.

The above description is equally applied to a case in which the lift down button 12 is pressed. When the lift down button 12 is pressed, the lift down button pressing transfer part 32 is pressed together. The lift down button pressing transfer part 32, which descends, operates the lift down switch 22 provided on the substrate 20, and the hoist recognizes that a descending operation of the hoist is input by the controller 10. In this case, the magnet body 40 is pressed together. The magnet body 40 moves downward while pressurizing the spring 50 along the magnet body guide 14. A degree of the descending movement of the magnet body 40 is detected by the Hall sensor 23. Even when the lift down button 12 is slightly pressed, the lift down switch 22 is operated. In this state, a degree of pressing of the lift down button 12 may be adjusted. The degree of the descending movement of the magnet body 40 is adjusted according to the degree of the pressing of the lift down button 12, and the degree of the descending movement of the magnet body 40 is detected by the Hall sensor 23.

Figure 10:
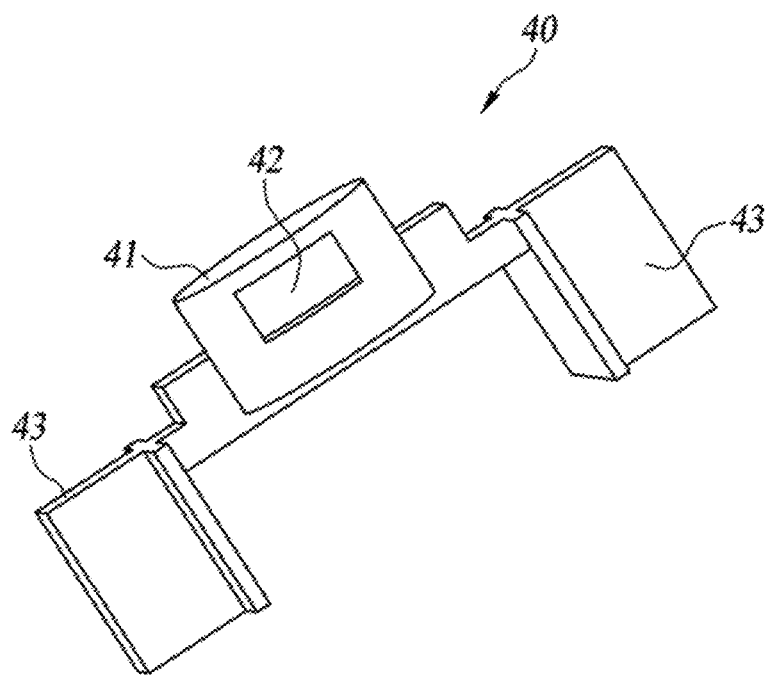
FIG. 10 is a diagram illustrating a magnet body.

FIG. 10 exemplarily illustrates a detailed structure of the magnet body 40.

The magnet body 40 accommodates a permanent magnet 42 which applies a magnetic force to the Hall sensor 23. A spring coupling part 41 into which the spring 50 is fitted is provided at a portion in which the permanent magnet 42 is accommodated. Guide insertion parts 43 may be provided on both sides of the magnet body 40 to be able to guide a vertical movement of the magnet body 40 along the above-described magnet body guide 14.

FIG. 11 illustrates a control method performed by the controller 10 which is described with reference to FIGS. 7 to 10.

According to one embodiment of the present invention, an output voltage which is output from the Hall sensor 23 may be varied in proportion to a pressed degree of the lift up button 11 or the lift down button 12 by a user, and a load applied to the motor is varied according to the output voltage such that a speed of the motor may be varied.

For example, according to one embodiment of the present invention, as the lift up button 11 or the lift down button 12 is pressed by the user, a magnetic flux density of the Hall sensor 23 may be increased and the output voltage, which is output from the Hall sensor 23, may be increased in proportion to the increased magnetic flux density. Further, according to one embodiment of the present invention, the load (i.e., variable resistance) applied to the motor is increased in proportion to the increased output voltage such that the speed of the motor may be controlled to be increased.

More specifically, a gap between the magnet body 40 and the Hall sensor 23 is varied according to the pressed degree of the lift up button 11 or the lift down button 12 of the controller 10 of the hoist. The varied gap applies a different magnetic flux density to an upper end of the Hall sensor 23 which is vertically located with respect to the magnet body 40. The gap is inversely proportional to the magnetic flux density, and the Hall sensor 23 outputs a voltage proportional to the magnetic flux density through a Hall element and an amplifier. The output voltage of the Hall sensor 23 is input to an analogue to digital converter and then converted into a digital value. The converted digital value is converted into a variable resistance value which is proportional to the pressed degree of the button of the controller 10 using digital potentiometer control software and a digital potentiometer control circuit of a microprocessor (MCU). That is, when the pressed degree of the button is large, a variable resistance value of a digital potentiometer becomes large, whereas, when the pressed degree of the button is small, the variable resistance value becomes small. Since a range of the variable resistance value of the digital potentiometer may have 8 bits, i.e., 256 different values, a pulse width modulation (PWM) pulse is used as 256 multi-stage speed command signals of a variable speed inverter of the hoist, and the motor of the hoist is controlled in a multi-stage according to the pressed degree of the button of the controller 10.

Alternatively, according to one embodiment of the present invention, as the lift up button 11 or the lift down button 12, which is pressed, is released from the user, a position of the lift up button 11 or the lift down button 12 may be restored due to an action of the spring 50 in a direction opposite a pressing direction. In this case, according to one embodiment of the present invention, the magnetic flux density of the Hall sensor 23 may be reduced, and the output voltage which is output from the Hall sensor 23 may be reduced in proportion to the reduced magnetic flux density. Further, according to one embodiment of the present invention, the load applied to the motor is decreased in proportion to the reduced output voltage such that the speed of the motor may be controlled to be decreased.

In accordance with the present invention, a controller of an electric hoist using an inverter driven motor, which is capable of performing multi-stage speed control of lifting up and down operations of the electric hoist, can be provided.

Further, in accordance with the present invention, a hoist including the controller can be provided.

While the present invention has been described with reference to specific items such as particular components, exemplary embodiments, and drawings, these are merely provided to help understanding the present invention, and the present invention is not limited to these embodiments, and those skilled in the art to which the present invention pertains can variously alter and modify from the description of the present invention.

Therefore, the spirit of the present invention should not be limited to the above-described embodiments, and it should be construed that the appended claims as well as all equivalents or equivalent modifications of the appended claims will fall within the scope of the present invention.

What is claimed is:

1. A controller of a hoist, comprising:
a lift up button which is adjustable in a pressed degree;
a lift down button which is adjustable in a pressed degree;
a lift up switch disposed below the lift up button so as to be immediately operated when the lift up button is pressed;
a lift down switch disposed below the lift down button so as to be immediately operated when the lift down button is pressed;
a magnet body operatively connected to both of the lift up button and the lift down button and disposed to descend during a pressing operation of the lift up button or the lift down button; and
a Hall sensor disposed to correspond to the magnet body so as to detect a descending degree of the magnet body being pressed by the lift up button or the lift down button,
wherein, when the lift up switch is operated by the lift up button, a motor initiates an ascending operation, and in this case, a variable resistance value, which is applied to the motor according to an output voltage which is varied according to an increase or decrease of a magnetic flux density detected by the Hall sensor, is adjusted such that a speed of the ascending operation of the motor is varied,
when the lift down switch is operated by the lift down button, the motor initiates a descending operation, and in this case, the variable resistance value, which is applied to the motor according to the output voltage which is varied according to an increase or decrease of the magnetic flux density detected by the Hall sensor, is adjusted such that a speed of the descending operation of the motor is varied, and
the output voltage of the Hall sensor is input to an analog-to-digital converter and then converted into a digital value, and the converted digital value is converted into a variable resistance value which is proportional to a depressed degree of the lift up or down button of the controller using digital potentiometer control software and a digital potentiometer control circuit of a microprocessor.

2. The controller of claim 1, wherein a variation range of the variable resistance value is 8 bits having 256 different values such that the speed of the motor is varied in 256 stage speeds.

3. The controller of claim 2, wherein the magnet body ascends or descends while being guided by a magnet body guide and is connected to a spring, and, when the pressing of the lift up button or the lift down button is released, the spring returns the magnet body and the lift up and down buttons, which are operatively connected to the magnet body, to their original positions.

4. A hoist comprising the controller according to claim 1.

* * * * *